United States Patent [19]

Still

[11] 3,762,200
[45] Oct. 2, 1973

[54] TOOLS FOR FIXING TUBULAR FASTENERS IN POSITION

[75] Inventor: Leslie Ernest Still, Wolverhampton, England

[73] Assignee: The Precision Screw & Manufacturing Company Limited, Willenhall, England

[22] Filed: Oct. 8, 1971

[21] Appl. No.: 187,805

[30] Foreign Application Priority Data
Oct. 27, 1970 Great Britain.................. 50,902/70

[52] U.S. Cl........................ 72/114, 72/391, 72/452
[51] Int. Cl.............................................. B21j 15/16
[58] Field of Search...................... 72/391, 114, 452

[56] References Cited
UNITED STATES PATENTS

| | | | |
|---|---|---|---|
| 1,712,456 | 5/1929 | Kollock.................................. | 72/452 |
| 2,944,581 | 7/1960 | Shymanski............................. | 72/452 |
| 3,047,182 | 7/1962 | Batten................................... | 72/391 |
| 3,412,594 | 11/1968 | Lund..................................... | 72/452 |
| 3,654,792 | 4/1972 | Mead..................................... | 72/391 |

Primary Examiner—Charles W. Lanham
Assistant Examiner—Gene P. Crosby
Attorney—Marshall & Yeasting

[57] ABSTRACT

The disclosure provides a tool for crimping tubular internally screw-threaded fasteners by axially collapsing the fasteners to create a bulge, in which a screw carried by the tool is engaged with the fastener and is then held stationary and axially displaced, the screw being unscrewed from the fastener at the conclusion of the displacement, and these operations being effected by including a lost-motion device in the drive to the screw. The lost-motion device disclosed includes a pair of discs trapping a drive ball between them so that rotation of one disc rolls the ball around a cam track between the discs and separates the discs to provide the axial displacement, drive being resumed when the ball reaches the ends of the tracks.

7 Claims, 6 Drawing Figures

PATENTED OCT 2 1973

TOOLS FOR FIXING TUBULAR FASTENERS IN POSITION

BACKGROUND OF THE INVENTION

This invention relates to tools for fixing tubular fasteners in position, the fasteners being of the kind comprising a tubular shank with a head at one end, and an internally screw-threaded portion at the other end, for insertion through a hole, e.g., in sheet metal, and then axial contraction so that the plain (un-screw-threaded) portion of the tubular shank is bulged outwardly, and the sheet metal is trapped between the head and the bulge.

Hitherto, tools for this purpose have comprised a screw which projects from a shouldered housing and is rotated but held axially relative to the shoulder: at first the screw enters through the shank and engages with the fastener threads, being permitted to move up to the fastener as it does so, and is then prevented from moving axially by abutment of the shoulder with the work and the continued rotation has caused axial movement of the fastener threaded portion, thus causing the axial collapse of the fastener. Such fasteners are made of relatively soft material, but nevertheless the repeated application of collapsing force via rotation of the screw results in high rate of wear on the screw, and although the screw threads may be hardened they are necessarily of the same thread size as the fasteners, and this wear has created difficulties and possibly prevented the more widespread use of such fasteners. Moreover, if the rotation is continued after collapse is completed, the fastener will rotate with the screw which reduces the efficiency of the hold of the fastener to the sheet metal.

SUMMARY OF THE INVENTION

The object of the present invention is to provide an improved tool in which the screw is stationary during the axial collapse, so as to provide improved hold and also reduce wear on the screw.

In accordance with the invention, a tool for fixing fasteners of the kind referred to is provided with a holder which is captive to a screw for engaging said fastener, said holder being arranged to be rotated via a lost-motion device whereby the holder may be held against rotation during axial travel for fastener collapse.

Preferably the tool is driven via a motor, for example a pneumatically or electrically operated screw-driver which may have a slipping clutch to allow the screw to cease rotation when fully engaged with the fastener.

Preferably the tool is arranged so that drive from the motor in one direction (e.g., clockwise) effects screw rotation for fastener engagement, and then reverse running (e.g., anticlockwise) effects axial displacement without screw rotation during lost-motion and when the lost-motion is taken up, continued reverse rotation causes the screw to disengage from the fastener.

DESCRIPTION OF THE PREFERRED EMBODIMENTS

Figure 1:
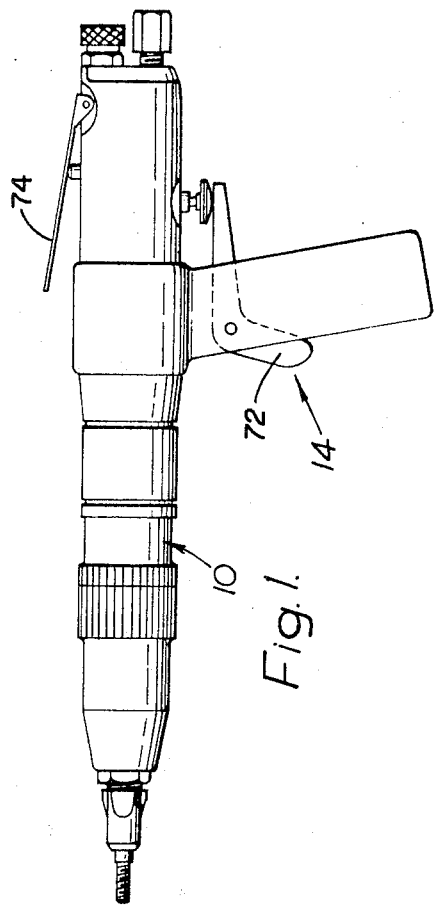
FIG. 1 is an elevation of a complete tool mounted on a power source.
Figure 2:
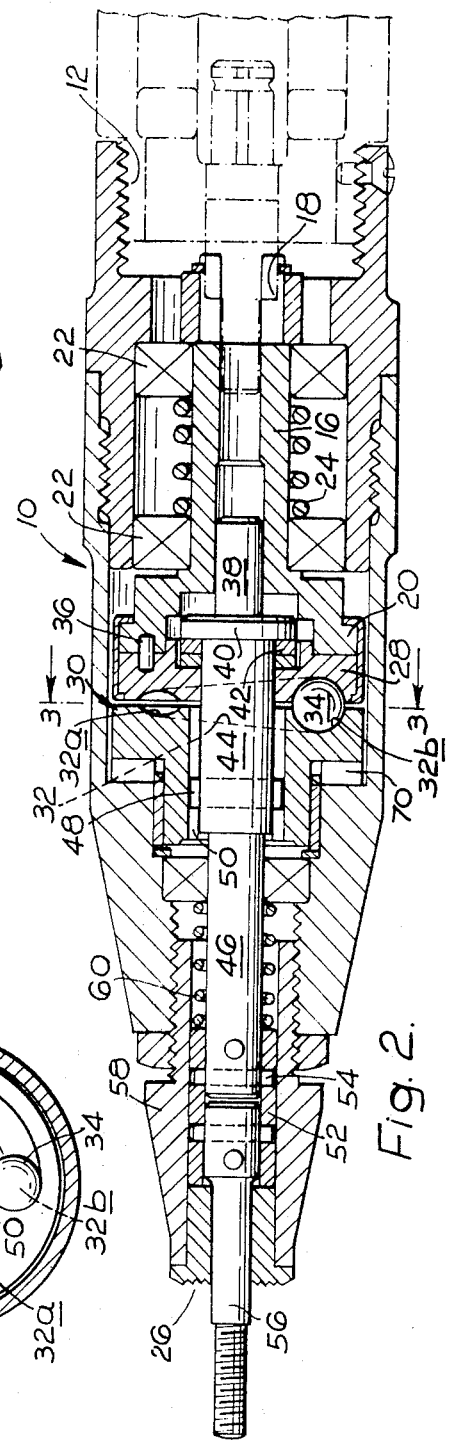
FIG. 2 is a sectional elevation of the tool.

Referring now to the drawings and particularly FIG. 2 thereof, a tool comprises a generally tubular casing 10 adapted to be screwed at 12 on to the output end of a pneumatic powered and reversible screwdriver tool 14 (FIG. 1) and the casing journals a main drive shaft made in two coaxial parts coupled by a cam arrangement as further described hereinafter.

A first of the shaft parts 16 is provided with a diametric slot 18 to engage the motorised screwdriver tool blade to transmit rotation therebetween, and the slot and blade are of lengths such that this shaft part can move axially whilst maintaining driving engagement. At the end opposite to the slot, the shaft part carries a radially extending flange 20. The shaft-part is journalled in bearings 22 towards each end of the portion lying between the flange and slot, and a coiled compression spring 24 extending between the flange and slot, and a coiled compression spring 24 extending between the journals urges the flange toward the output end 26 of the motorised tool.

Figure 3:
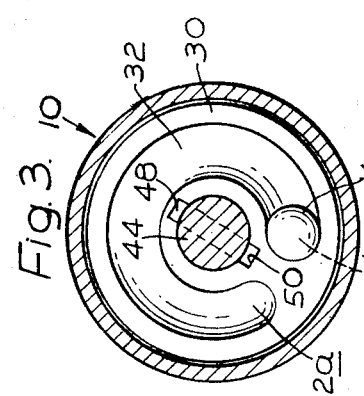
FIG. 3 is a view on the line 3—3 of FIG. 2.

The cam arrangement comprises a pair of discs 28, 30 coaxially arranged with a cam track 32 (see FIG.3) recessed in the face of each disc and extending about an arc of less than 360° concentrically of the disc, the track inclining from maximum depth at one end 32a of the track to minimum at the other end 32 b. The discs are face-to-face so that the tracks are aligned, but are reversed images of one another. For example, when the deeper ends of the tracks are adjacent each other in axial alignment with the tool, one track extends clockwise, and the other counter-clockwise, toward the shallow end of the track.

A ball 34 is trapped between the two discs, and lies in the two tracks.

The flange 20 is coupled to a first cam part by one or more pins 36.

The second shaft part comprises a pilot 38 received in a bore in the end of the first shaft part, a radial enlargement 40 received in a recess located between the flange and the adjacent cam disc, a pair of thrust washers 32 preferably being trapped between the enlargement 40 and the cam part 28, an axial portion 44 which is slidable through aligned coaxial bores in the cam discs, and a drive-transmitting tail 46. Said axial portion carries a key 48 and the second cam disc 30 has a keyway 50 which is complementary.

The tail of the second shaft part has a connection to a holder sleeve 52, via cross pins 54, and the sleeve is connected to a screw 56 by like cross-pins. This enables a tool to be made for use with different sizes of fasteners by interchanging only the screw, and to this end the housing may include a cap 58 through which the screw projects, and which is detached to bare the pins for removal and replacement. The tail is journalled in the housing. A further compression spring 60 is located between a tail bearing and the sleeve 52.

Figure 4:
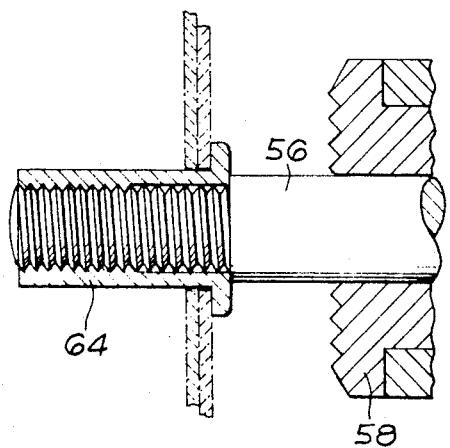
FIG. 4 and FIG. 5 show the fastener securing operation in two stages.

In use, the motor in part 14 is driven, e.g., clockwise, to rotate the shafts, and the screw is guided into a fastener 64, FIG. 4. The screw-threads engage and the whole tool is moved bodily up to the work in the axial movement of the screw in the fastener. When the cap abuts the work, axial movement is stopped. Drive up to this point has been to the first shaft 16 via the slot, and from the flange 20 to the first cam disc 28; from the second cam disc 30 to the second shaft part 44 the drive is via the key and keyway 48,50. The spring 24 holds the cam discs together, and the ball (assumed to be in the deeper recessed ends of the tracks) acts to transmit drive from one disc to the other.

Figure 5:
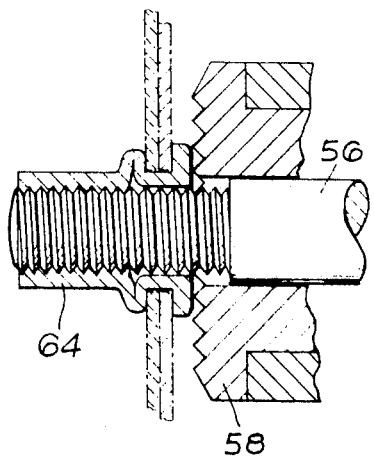

However, when the cap abuts the work the drive motor is reversed, but upon reversal, rotation of the screw 56 is initially effectively interrupted by the ball and cam tracks acting as a lost-motion or limited slip device. Upon reversal, the ball rolls around the tracks, and the discs relatively rotate, i.e., the motor driven disc 28 turns through substantially two revolutions whilst the other disc remains stationary. During this lost motion, the ball moves from the deeper ends of the tracks to the shallower ends, and separates the discs, and this displaces the second shaft part 44, 46 axially via the thrust washers. Movement of the key in the keyway maintains drive connections to the screw (which is required subsequently) although the screw remains rotationally still during axial movement. Rotation from the drive motor is continued in the same direction following completion of the axial movement. The screw 56 will rotate when the lost motion is completed, but in a reversed rotation to unscrew the screw from the fastener. In the axial movement the fastener is collapsed (FIG.5). This collapse is wholly achieved in less than two revolutions of the shaft.

The second cam disc may abut an internal shoulder in the housing with an interposed annulus of friction material 70 which brakes the second disc to prevent any tendency for it to be rotated during the ball movement.

During the relative rotation of the cam discs the latter separate, as disc 30 moves very slightly toward the braking annulus 70 and disc 28 moves with the one bearing 22 towards the other and compression spring 24. In the unscrewing movement of the screw from the fastener, the sleeve 52 may be axially displaced against spring 60 and in this event abutment 40 moves in the enlarged space in the flange 20.

At the start of the next cycle of operations, the first two revolutions in the forward direction again will restore the screw to the axially projecting position and restore rotational drive to the screw: in this final position the second cam disc is spaced axially from the friction disc and this also reduces wear on the same.

In this embodiment, the collapsing force is applied to the cam tracks and ball, and to the friction disc. Due to the large areas of disc, and the movement of the ball on the hardened tracks, it is believed that the wear rate will be acceptably low.

In operation, the operator may apply the fastener to the tool prior to insertion of the fastener into the work, and after such insertion, reverse the motor.

The pneumatic tool 14 is a standard component in which operation of trigger 72 causes e.g. clockwise rotation, and trigger lever 74 causes anticlockwise rotation.

Figure 6:
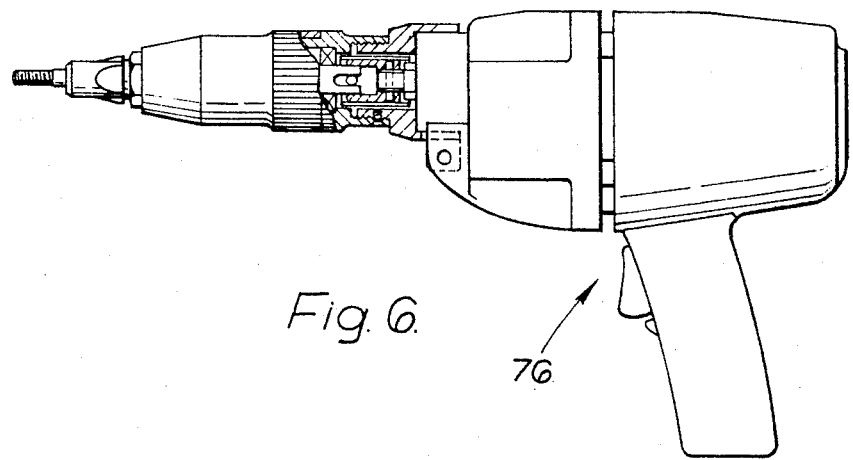
FIG. 6 shows a modified tool.

In the tool of FIG. 6, an electric motorised pistolgrip tool 76 is employed having a reversible motor.

I claim:

1. A tool for axially collapsing tubular, internally threaded fasteners having a flange at one end, to trap an apertured sheet between the flange and a bulge created in the fastener by collapse thereof, said tool comprising a body portion in which is slidably and rotatably mounted a holder for a screw-threaded bit engageable with the fastener, wherein the improvement comprises a drive train for transmitting rotational movement to the holder from a power source, said drive train comprising an input portion adapted to be connected to the power source and an output portion fixed to the bit holder, which have a lost motion connection with one another, and which have cooperating inclined cam surfaces that cause relative axial movement of the input and output portions to extend the bit holder during lost motion at the start of rotational movement of the input portion in a first direction, and cause relative axial movement of the input and output portions to retract the bit holder during lost motion at the start of rotational movement of the input portion in the other direction, whereby the input portion of the drive train may be driven in the first direction to screw the bit into a fastener until the body portion can be held against the work, and may then be driven in the other direction to retract the bit and thus axially collapse the fastener and then unscrew the bit from the fastener.

2. A tool according to claim 1 comprising two opposed cam plates, each carried by one of the two portions of the drive train, having a cam track between them, and a ball in the cam track which spaces the plates and which rides in the cam track to provide lost motion and to change the spacing between the plates.

3. A tool according to claim 2 wherein the cam track is defined by arcuate grooves formed one in each of the adjacent faces of the cam plates.

4. A tool according to claim 3 wherein the grooves are of reducing depth from one end towards the other and extend circumferentially around the respective plates.

5. A tool according to claim 2 comprising spring means urging the plates towards one another.

6. A tool according to claim 2 comprising means for resisting rotation of the output portion during rotation of the input portion of the drive train in said other direction.

7. A tool according to claim 6 comprising spring means for biasing the bit holder in the extended direction.

* * * * *